Aug. 11, 1931.  C. T. McGILL  1,818,638
MULTIPLE FLOW BASE EXCHANGE WATER SOFTENER
Original Filed Nov. 17, 1925  2 Sheets-Sheet 1
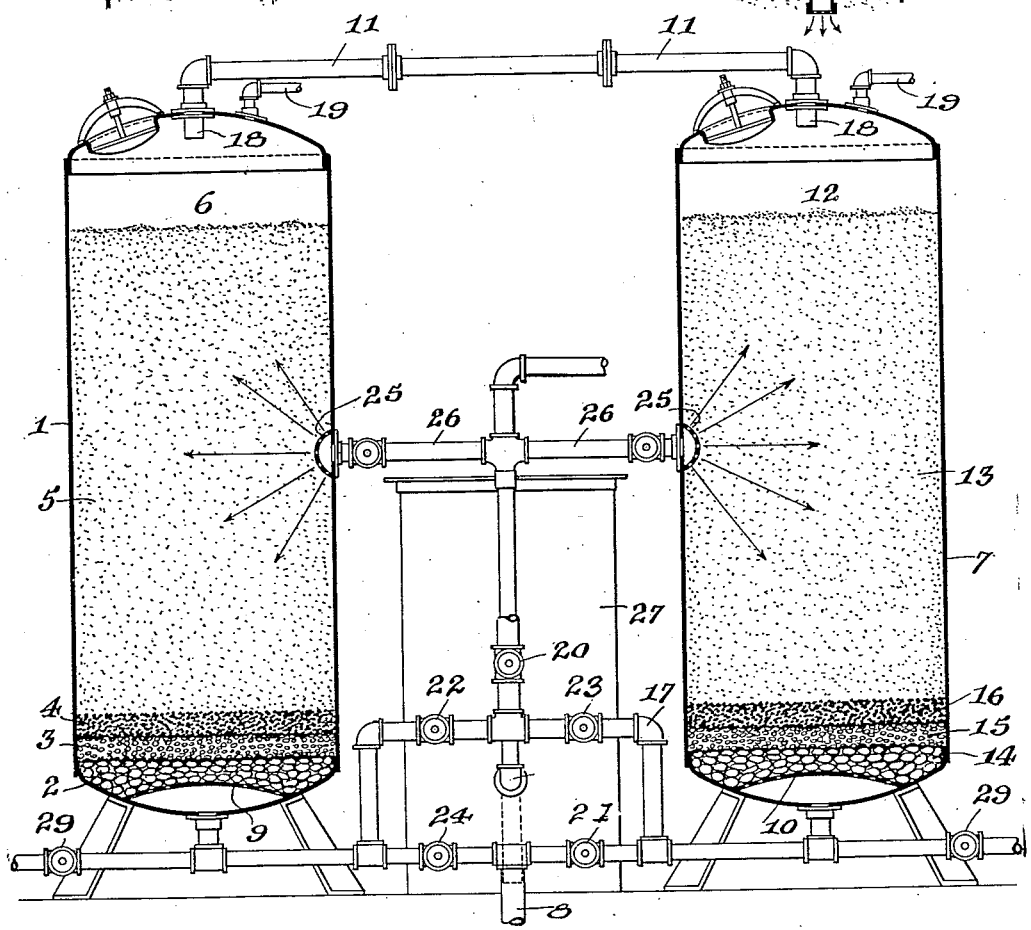
Inventor
Chester T. McGill
By Mason Fenwick & Lawrence
Attorneys

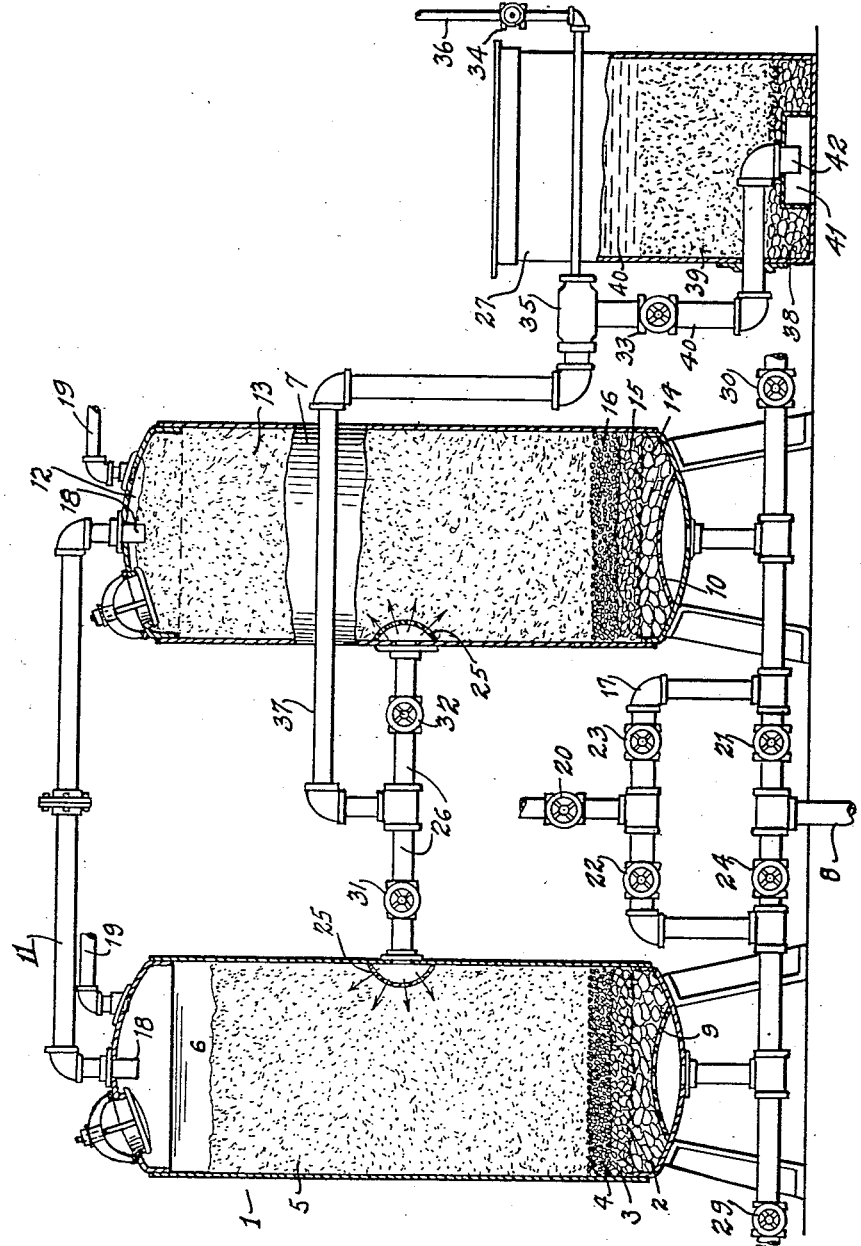

Patented Aug. 11, 1931

1,818,638

UNITED STATES PATENT OFFICE

CHESTER T. McGILL, OF ELGIN, ILLINOIS, ASSIGNOR TO REITER COMPANY, OF ELGIN, ILLINOIS, A CORPORATION OF ILLINOIS

MULTIPLE FLOW BASE EXCHANGE WATER SOFTENER

Application filed November 17, 1925, Serial No. 69,672. Renewed November 2, 1929.

This invention relates to a multiple flow base exchange water softener, preferably of a two-flow type.

The prime object of this invention provides improved means whereby a finer base exchange mineral may be used, and wherein the ordinary free-board space may be approximately eliminated.

A further object of this invention is to provide a softener which eliminates the usual waste of base exchange mineral carried away with the softened water or backwashed away during regenerating periods.

An object of this invention is to provide a multiple flow softener combining the usual up-flow method together with a down-flow method, thereby filtering the water before it comes in contact with the softening base exchange mineral, also filtering the softened water before it leaves the softener to the soft water lines.

A further object is to provide means whereby the capacity of flow of water through the softener is greatly increased over the common practice. Further objects of this invention will appear from the following detailed description, and as disclosed in the drawings, which are herewith made a part of this application.

In the drawings,

Figure 1 represents a vertical diagrammatic view of the multiple base exchange water softener.

Figure 2 illustrates a diagrammatic view of a brine distributing nozzle adapted to extend into the mineral within the softener.

Figure 3 illustrates a modified form of the distributing nozzle for the brine solution as disclosed in Figure 2.

Figure 4 represents a vertical diagrammatic view of the multiple base exchange water softener including a plurality of softening units and a regeneration tank connected therewith.

Numeral 1 designates a tank or container adapted to use as a base exchange water softener, containing at the lower portion thereof a plurality of layers of filtering material having different meshes as at 2, 3 and 4, the finer mesh being located as the top layer 4. Above these layers 2, 3 and 4 is positioned the base exchange mineral 5, above which is located the free-board space 6. The disclosure and description herewith illustrates a two-flow softener composed of the two tank portions, 1 and 7, one of the elements or tanks, as at 1, being adapted to serve for an up-flow and tank 7 as a down-flow operation.

The hard or raw water enters through the connecting element leading from 8, flowing therefrom through a distributing plate or a system of perforations as at 9 and 10, in order to maintain an even distribution at all points in the bottom of the tanks comprising the softeners. The water then seeps into the filtering bed 2, then into a still finer filtering bed 3, and finally into a filtering bed 4. These filtering beds or plates may consist of any suitable filtering material, such as alundum, or any molded or unmolded substance, such as quartz or gravel. By the time the water passes through these three filtering materials, suspended matter has been filtered from the water. The water then passes or seeps up through the bed of base exchange material 5, flowing therefrom through the free-board space 6, then into the connecting element 11, and from there through the top of the down-flow softener element 7 into the free-board space thereof as at 12, from thence passing through the base exchange mineral 13, then through the three layers of filtering materials 14, 15 and 16, the finer layer being element 16, and from thence the water flows through the perforated plate 10 into element 17.

The connecting element 11 to the tops of the softener containers 1 and 7 have portions 18 extending a suitable distance into the free-board spaces 6 and 12, for the purpose of accumulating the scum and impurities which float on the top, or might accumulate in the free-board space of the softener, so that the impurities and the scum may be easily drawn off through the element 19. The water which has been softened in the tank 7 passes through the base perforated plate 10 into the soft water line 17, then out into soft water lines 20. During the process of softening water, as above described, valves 21 and 22 remain closed, while valves 23 and 24 remain open. It has been determined by experimentation that after regeneration by reversing the flow by closing valves 23 and 24 and opening valves 21 and 22, will act to equalize the mineral in the two tanks and keep the mineral in a highly efficient state.

The advantage of the two-flow softener as described in this application, is apparent from considering the fact that each element 1 and 7 may be charged at the beginning with a certain quantity of mineral. This mineral may be of finer grade than ordinarily used in up or down-flow softeners. Finer material exposes to the water a larger surface than can be exposed by coarser materials, thereby increasing the exchange capacity considerably; as a matter of fact to an extent of about 65% as determined by experiment. A common disadvantage of softeners at present used is that the so-called "fine exchange minerals" are carried away with the softened water, not only causing a great waste but also delivering a water which is rendered impure by the carrying of these fine materials with the softened water. In the two-flow softener, according to this invention, no fine base exchange material can be carried away as the beds of mineral and filtering material in both the elements 1 and 7 place a positive stop to the out-flow of the base exchange minerals. In the practical operation of this invention, as well as in the process of backwashing, the fine base exchange minerals will be carried from one of the elements 1 to the other element 7, and vice versa, and will remain in the top portions of the elements 1 and 7, but will not find their way to an outlet at the bottom of either element.

The use of two elements or tanks 1 and 7 in this invention, filled with a finer grade of zeolite provides that the capacity in gallons per minute is not only increased considerably, but the whole process of softening is divided by means of this invention into two stages, thereby giving the complete process or method a possibility for a greater flow rate in softening due to the fact that the water travels a longer distance through the base exchange mineral than any of the other commonly known softeners. With this two-flow softener the tank containers 1 and 7 may be more nearly filled with the base exchange mineral 5 and 13 than would be possible with the one-way down-flow or up-flow softener, as the amount of free-board spaces 6 and 12 would not be necessary with the two-flow softener for the reason that there is no possible means for the fine mineral being carried out by backwashing or with the softened water.

The increased amount of mineral used in the softener according to this invention means an increase of 30 to 35% in capacity. This increase together with the increase of capacity by the use of finer mineral amounts to over 100% increase per given size softener. The advantage of the two-flow softener as described herewith is apparent when it is considered that the two elements or tanks 1 and 7 are interchangeable in their operation, by which it is intended that one tank may be operated as an upflow, while the other one is operated as a down-flow. The one that may be operating under a down-flow can be operated again as an up-flow, or vice versa.

It is to be understood that this invention is not limited to the use or adaptation of two tanks or softeners. A plurality of these tanks or softeners may be used in combination without affecting the merits of this invention. That is, a third tank or softener may be added so that an up-flow and down-flow effect may be accomplished, while the third element is being regenerated, the by-passes being so arranged that the element to be regenerated may be closed off from the regular softening lines, or from the other tanks or elements.

In the water softening equipments at present on the market, it is customary to supply a brine solution from the top or from the bottom. Experience has disclosed that disadvantages are connected with both of these procedures, and this invention includes a device or method whereby the disadvantages herewith enumerated may be avoided by introducing the brine solution into suitable portions of the surfaces of the tank containers 1 and 7 as at 25, the brine solution being adapted to flow through the perforated plate elements 25 into the tank containers 1 and 7, at a suitable point between the top and bottom of the base exchange mineral. The inlet pipes 26 for the brine solution are provided at their terminals with a distributing nozzle 25 comprising a perforated plate as above described, which is adapted to throw the brine solution as it leaves the perforated plate within the containers in radial direction through the mineral, thereby stirring the mineral and tending to keep it during the brining period in a turbulent condition, so as to effect a closer contact of the brine and mineral, thereby bringing about a quicker exchange of the action of the brine solution on the incrustating solids effecting a saving in the amount of brine solution required to regenerate a given amount of material. It is apparent from the device and method herewith described that a considerable saving of salt per cubic foot of mineral is attained. The excessive use of salt has been often found as a point of complaint by users of softener devices, on account of the large amount of salt being used and the extra amount of fresh water required to backwash the salt out, when salt is introduced that is not used or required to regenerate the mineral.

In this invention the distributing nozzle 25 for the brine solution may be omitted, and a modified form substituted as disclosed in Figures 2 and 3. The modified distributing nozzles or plates are adapted to be connected with the brine inlet pipes 26, and may extend in any suitable direction within the tank containers 1 and 7 as clearly disclosed in the Figures 2 and 3, thereby effecting a more efficient spraying of the mineral by the brine solution.

Numeral 27 designates a brine supply tank from which the brine solution may be supplied by ejector or pump to the containers 1 and 7, while 28 designates a brine solution tank from which the brine solution may be supplied by means of gravity to the containers, through the distributing points 25.

Valves 29 are adapted as drain valves used when backwashing the softener on regenerating.

Figure 4 clearly brings out the operation of the softener, especially the brining portion and the regenerating of the softener. The multiflow water softener consists of two or more softening units and provides a means for passing the water to be softened upwardly through the zeolite mineral contained in pressure tank 1, then downwardly through zeolite mineral contained in another pressure tank 7. A series of pressure tanks may be used and a portion of them can be cut out of service for regenerating purposes while the balance are in operation furnishing softened water.

Figure 4 illustrates clearly that the water to be softened may pass upwardly through either unit, then downwardly through a second unit, either in the softening process or at regenerating periods.

One of the prime objects in this invention is making possible the use of fine zeolite mineral without the liability of wasting the zeolite mineral during the softening period or at regenerating periods. It has been the custom to grade zeolite mineral, either synthetic or greensand, in order to keep the fine mineral from being backwashed out or carried out with the softened water, both of which are objectionable and expensive due to the loss of the zeolite; also, by eliminating the fine mineral which always gives a greater capacity in exchange than the coarser mineral, it reduces the amount of water that can be softened per cubic foot of zeolite mineral.

By using the finer mineral, according to this invention, the capacity of the softener is greatly increased due to the fact that the tank or tanks are practically filled with zeolite mineral, eliminating the usual freeboard space, also the use of finer mineral gives a great deal higher capacity than zeolite that is used in the ordinary water softener.

In operation, the zeolite mineral grades itself as the portion of the unit used in upflow softening, the water keeps this portion of the mineral in a semi-suspended condition. Thus the larger pieces of zeolite mineral naturally are graded and carried to the bottom while the finer material is carried to the top, and some of the finer mineral is carried out through the element 11 to the downward flow unit where it is retained in the top of this unit as at space 12, in tank 7.

After this unit is regenerated the current of the water is reversed, the raw water entering, for the next run, into the bottom of tank 7, passing upwardly through tank 7, through connecting element 11, down through tank 1 and out of the bottom of tank 1 into the soft water line.

After the softeners have been operated for some time and the flow of water has been reversed from one tank to the other, the mineral is thoroughly graded and the fine mineral will be found in the top portion of the two tanks.

When tank 1 is used as an upflow softener, the valves 20, 23, and 24 are opened. All other valves are closed. The water enters through line 8, valve 24, perforated plate 9, distributing material 2, 3, and 4, zeolite mineral 5, upwardly through the tank 1 into space 6, leaving the tank 1 at the opening in nipple 18, passing out into element 11 and into tank 7 at the top at space 12, where the water passes downwardly through zeolite mineral 13, distributing material 16, 15, and 14, perforated plate 10, out of the bottom of tank 7, through valves 23 and 20, to the soft water discharge.

When the zeolite mineral has reached its capacity in exchange and it is necessary to regenerate this mineral before using the softener further, brine solution is ejected from brine tank 27 to the water softener in the following manner:—

The brine tank has a space in 41, for the purpose of accumulating a saturated brine solution at a point where the solution can be siphoned from the brine tank free from sediment and salt. There being a few inches of gravel or quartz as at 38 over the brine space 41 for the purpose of keeping the salt from getting into brine box 41, several inches of undissolved salt is kept in the brine tank as at 39 and a supply of water is kept above salt 39 as at 40.

To regenerate the unit this is accomplished efficiently in two different methods, as follows:

First, the brine solution is ejected from the bottom of the brine tank 27 by opening valves 33, 34, and 31, through pipe line 42 and 40, valve 33, ejector 35, line 37 and 26, valve 31, and through spray nozzle 25, into the side of the tank 1, and into the zeolite mineral 5.

Valves 29 and 30 are opened sufficiently to allow a percent of the brine solution and water to pass downwardly through tank 1 and out valve 29, and a portion of the brine solution to pass upwardly in tank 1, out through element 11 and down through zeolite mineral 13 and out of valve 30.

When a sufficient amount of brine solution has been ejected into softener, valves 31, 33, 34, and 30 are closed. Then valve 21 is opened, allowing the raw water to pass upwardly through tank 7, zeolite mineral 13, out of tank 7, through element 11 and down into tank 1 through zeolite mineral 5, and out of the bottom of the tank 1 through valve 29. When the water comes soft at valve 29, the softener is again ready to be put in operation. Valve 29 is then closed and valve 22 is opened. This leaves valves 21, 22 and 20 open, and all the other valves would again be closed.

The second regenerating process is accomplished in the following way:

Assuming that tank 1 was used for the upflow and tank 7 for the downflow, valves 23 and 24 are closed, and valves 29, 32, 33 and 34 are opened. This creates a siphon through nipple 42, valve 33 into line 37 and 26, valve 32 into zeolite mineral 13 at the side of the tank 7; the brine solution passing largely upwardly through the zeolite 13, out through connecting element 11 into tank 1 at the top, down through zeolite mineral 5 and out at the bottom of the tank through valve 29, to the drain.

These valves remain open until a sufficient amount of brine solution has been ejected from brine tank 27. Then valves 33, 34 and 32 are closed. During the adding of the brine solution, the majority of the brine solution having passed upwardly through tank 7 into tank 1, and as the exchange of the calcium for the chloride is taking place, the calcium is carried to the waste through valve 29.

During the operation a portion of the brine solution has found its way down into the zeolite mineral 13 as contained in the bottom of container 7. This portion of the zeolite mineral is the portion that is not entirely exhausted when the softener is regenerated. Therefore a small amount of brine solution passing into this portion of the mineral, will entirely regenerate the zeolite mineral in the bottom of tank 7.

The brine solution that is passed upwardly through tank 7 and downwardly into tank 1 is regenerating largely the zeolite mineral from the point at which the brine enters tank 7, as at 25, and the zeolite in tank 1. Then by opening valve 21 allowing the raw water to enter the bottom of tank 7, it passes upwardly carrying the brine solution from the bottom portion of tank 7, up through zeolite mineral 13, and any remaining sodium not consumed by the zeolite in the bottom of tank 7 is carried up through the zeolite contained in the top portion of tank 7, then through element 11 and down through zeolite in tank 1. The remaining brine solution that is left in the bottom of tank 7 is used to complete the regeneration of the zeolite mineral in the top portion of tank 7 and in tank 1. Water is allowed to run in the bottom of tank 7 and out of the bottom of tank 1 until the water becomes soft, after which valve 29 is closed and valve 22 is opened. This leaves the softener in operation, reversing the flow from the previous run of softener.

When three tanks or more are used in a softening unit, one tank can be shut off from the other two and regenerated while the other two are in operation.

What I claim is:—

1. A base exchange water softener comprising a plurality of spaced tanks, filtering material in each of the tanks, base exchange material supported on the filtering material, a connecting element establishing communication between each of the tanks at a point intermediate the upper surface of the base exchange material and the top of each of the tanks and adapted to carry the fine base exchange material from one tank to the other by the flow of liquid through the apparatus in either direction.

2. A base exchange water softener comprising a plurality of spaced tanks, filtering material in each of the tanks, base exchange material supported on the filtering material, a connecting element establishing communication between each of the tanks at a point intermediate the upper surface of the base exchange material and the top of each of the tanks and adapted to carry the fine base exchange material from one tank to the other by the flow of liquid through the apparatus in either direction, and a scum outlet communicating with each of the tanks.

3. A base exchange upward and downward flow water softener comprising a plurality of spaced tanks, base exchange mineral within the tanks, means for conveying base exchange mineral between the tanks, and means for receiving and collecting flocculent sediment and scum from said tanks.

4. In a water softener, a body of zeolite through which hard water is adapted to be passed so that the zeolite becomes progressively exhausted in the direction of passage of the hard water, and means for admitting brine by positive flow through the nearly exhausted portion of said zeolite body, and by diffusion through the less exhausted part.

In testimony whereof I affix my signature.

CHESTER T. McGILL.